(12) United States Patent
Hadjioannou et al.

(10) Patent No.: US 9,377,334 B2
(45) Date of Patent: Jun. 28, 2016

(54) FLOWMETER HAVING AN INTERCHANGEABLE ELONGATE MEMBER ATTACHED TO THE INNER SURFACE OF A PIPE SECTION HAVING A RADIUS OF CURVATURE

(71) Applicant: Engineering Partners International, Inc., Kingwood, TX (US)

(72) Inventors: John Hadjioannou, Kingwood, TX (US); Gregg Perkin, Kingwood, TX (US); Michael Baugh, Spring, TX (US)

(73) Assignee: Engineering Partners International, Inc., Kingwood, TX (US)

( * ) Notice: Subject to any disclaimer, the term of this patent is extended or adjusted under 35 U.S.C. 154(b) by 0 days.

(21) Appl. No.: 14/621,916

(22) Filed: Feb. 13, 2015

(65) Prior Publication Data

US 2015/0233744 A1     Aug. 20, 2015

Related U.S. Application Data

(60) Provisional application No. 61/939,576, filed on Feb. 13, 2014.

(51) Int. Cl.
    G01F 1/40          (2006.01)
    G01F 1/44          (2006.01)

(52) U.S. Cl.
    CPC ... *G01F 1/44* (2013.01); *G01F 1/40* (2013.01)

(58) Field of Classification Search
None
See application file for complete search history.

(56) References Cited

U.S. PATENT DOCUMENTS

| | | | | |
|---|---|---|---|---|
| 1,706,145 A | | 3/1929 | Collins | |
| 4,174,734 A | * | 11/1979 | Bradham, III | G01F 1/44 138/39 |
| 4,753,114 A | * | 6/1988 | Jones, Jr. | G01F 1/36 374/54 |
| 4,961,349 A | * | 10/1990 | Tanis | G01F 1/44 73/861.52 |
| 5,693,891 A | * | 12/1997 | Brown | G01F 1/36 73/861.04 |
| 5,913,249 A | * | 6/1999 | Weckstrom | A61B 5/087 73/861.52 |
| 5,925,831 A | * | 7/1999 | Storsved | A61B 5/087 128/204.23 |
| 6,058,787 A | * | 5/2000 | Hughes | G01F 1/32 73/861.52 |
| 6,339,963 B1 | * | 1/2002 | Torkildsen | G01F 7/005 73/197 |
| 7,299,707 B1 | * | 11/2007 | Evans | G01F 1/44 73/861.63 |
| 7,357,040 B2 | | 4/2008 | Bell | |
| 2003/0226405 A1 | * | 12/2003 | Bell | G01F 1/40 73/861.52 |
| 2008/0216587 A1 | | 9/2008 | Bell | |
| 2011/0132104 A1 | * | 6/2011 | Benson | G01F 1/40 73/861.63 |

FOREIGN PATENT DOCUMENTS

| | | |
|---|---|---|
| WO | 0208702 A1 | 1/2002 |
| WO | 2012061873 A1 | 5/2012 |

* cited by examiner

*Primary Examiner* — Harshad R Patel
(74) *Attorney, Agent, or Firm* — Tomlinson Rust McKinstry Grable

(57) ABSTRACT

A flow meter for measuring the flow of fluid through a pipe. The flow meter has an elongate member attached to an interior surface of the pipe. The elongate member has a leading end, a trailing end, a longitudinal axis, a first side, and a second side. The first side extends from the leading end to the trailing end and defines a cylindrical cross-sectional shape with a radius of curvature corresponding to the radius of curvature of the pipe and extending along an arc of less than 180 degrees. The second side extends from the leading end to the trailing end and is exposed to the interior of the pipe. The second side forms a constriction in a cross-sectional area of the pipe. Pressure sensors determine a pressure differential caused by the elongate member which is used to determine the volume of fluid flowing through the pipe.

23 Claims, 4 Drawing Sheets

US 9,377,334 B2

FLOWMETER HAVING AN INTERCHANGEABLE ELONGATE MEMBER ATTACHED TO THE INNER SURFACE OF A PIPE SECTION HAVING A RADIUS OF CURVATURE

CROSS REFERENCE TO RELATED APPLICATION

This application claims the benefit of provisional patent application Ser. No. 61/939,576, filed on Feb. 13, 2015, the entire contents of which are incorporated herein by reference.

FIELD

The present invention relates generally to flowmeters used to measure the flow of material through piping and specifically to a wedge-shaped flow meter.

SUMMARY

The present invention is directed to an apparatus for measuring the flow of fluid through a pipe having a radius of curvature, an inner diameter, and an interior wall surface. The apparatus comprises an elongate member. The elongate member is attached to an interior surface of the pipe. The elongate member comprises a leading end, a trailing end, a longitudinal axis, a first side, and a second side. The first side extends from the leading end to the trailing end and defines a cylindrical cross-sectional shape with a radius of curvature corresponding to the radius of curvature of the pipe and extending along an arc of less than 180 degrees, the first side terminates at opposed edges. The second side extends from the leading end to the trailing end and is exposed to an interior of the pipe. The second side forms a constriction in a cross-sectional area of the pipe. The second side comprises a leading face having a length approximately one-half the inner diameter of the pipe, a trailing face, and a truncated apex having a length approximately one-third the inner diameter of the pipe. The truncated apex extends between the opposed edges and defines a rounded edge at an intersection of the leading face and the truncated apex which is orthogonal to the longitudinal axis.

The present invention is also directed to a fluid flow meter. The flow meter comprises an elongate pipe section, a first flange, a second flange, an elongate member, an upstream pressure sensor, and a downstream pressure sensor. The elongate pipe section has an upstream end and a downstream end, and an inner diameter. The first flange is attached to the upstream end and the second flange is attached to the downstream end. The elongate member is attached to an interior surface of the elongate pipe. The elongate member comprises a first side and a second side. The first side defines a cylindrical cross-sectional shape with a radius of curvature corresponding to a radius of curvature of the pipe and extending along an arc of less than 180 degrees. The first side terminates at opposed edges. The second side opposes the first side and is exposed to an interior of the pipe. The second side is configured to constrict a cross-sectional area of the pipe. The second side comprises a leading face, a trailing face, and a truncated apex. The leading face has a length approximately one-half the inner diameter of the pipe. The truncated apex has a length approximately one-third the inner diameter of the pipe. The truncated apex extends between the opposed edges and defines a rounded edge, at an intersection of the leading face and the truncated apex, which is orthogonal to a longitudinal axis of the pipe. The upstream pressure sensor is positioned within the pipe upstream of the leading face of the elongate member to measure a first pressure. The downstream pressure sensor is positioned on the truncated apex of the elongate member and downstream of the leading face to measure a second pressure.

DESCRIPTION

Figure 1:
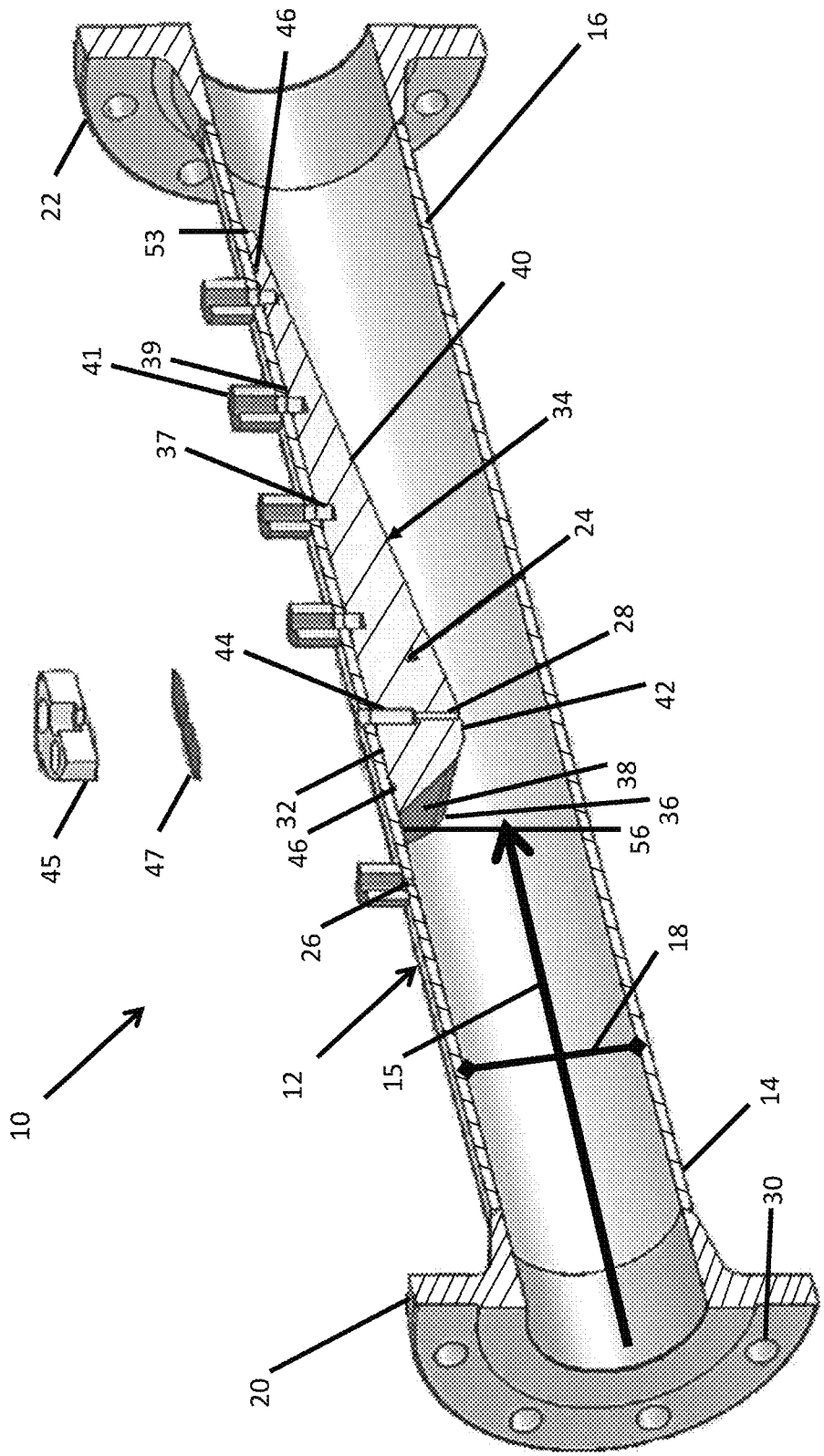
FIG. 1 is diagrammatic, longitudinal section view of the flow meter of the present invention installed in a pipe section.
Figure 2:
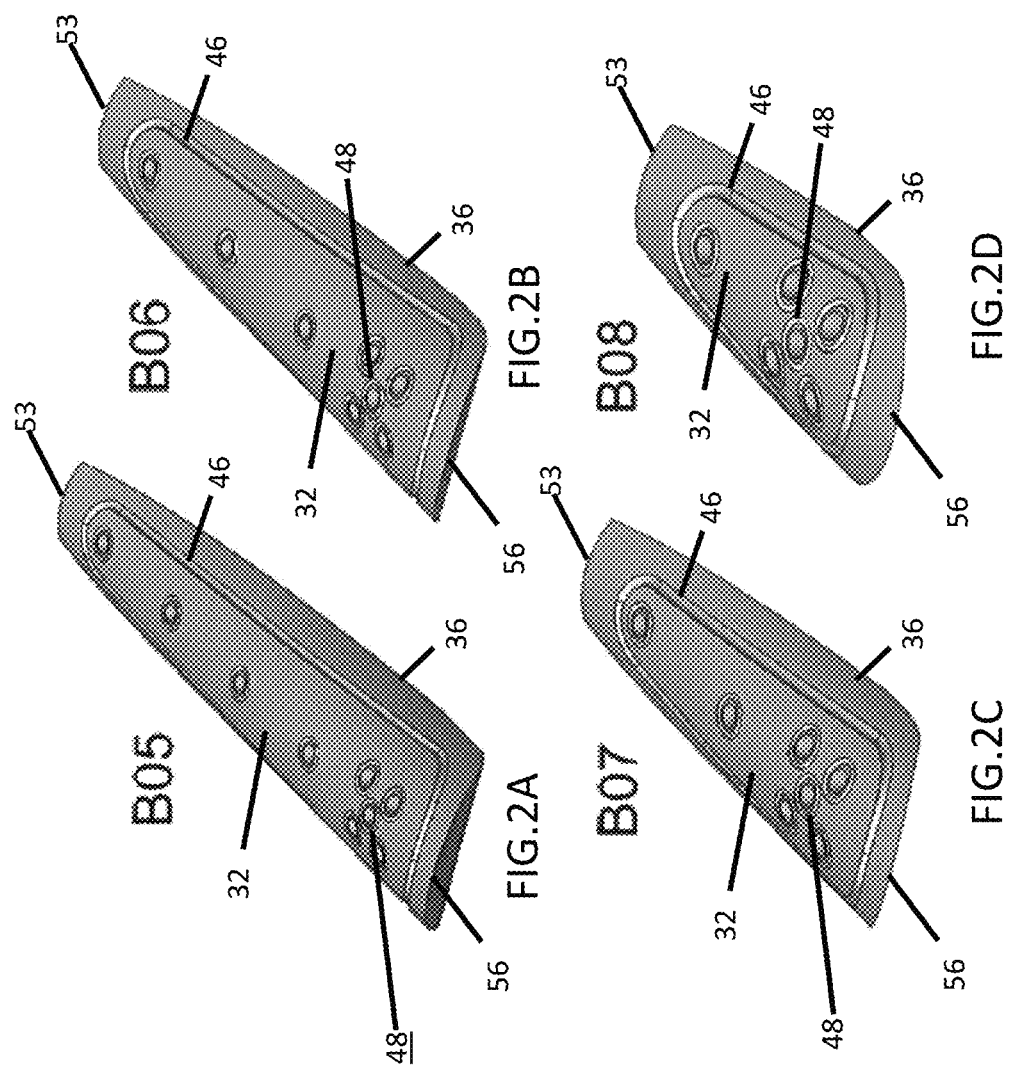
FIGS. 2A-2D are perspective views of an elongate member used with the flow meter of the present invention.

The measurement of the volume of a fluid passing through a pipe line is essential to several industries throughout the world. For example, the oil and gas industry relies on measuring the volume of oil and gas products flowing through a pipe line to track revenues. Thus, accurately measuring the flow of fluid through the pipeline is one of the most critical tasks in the oil and gas industry. Such measurements are often used to calculate the profit or losses of producing assets. Inaccurate flow measurement, in addition to providing inaccurate data for payout, can create a hazard for personnel, equipment, or the environment near the asset.

Depending on the type of fluid to be measured, many different types of flow meters have been developed over the years. Devices such as orifice plates, Venturi wedges, positive displacement devices, turbines and other meter types have been used. However, these devices are not well adapted to handle measurement of multiphase and viscous fluids. Additionally, these devises often have high initial and long-term costs. Furthermore, entrained particles or separate phases cause wear on the critical components and dimensions of these devices which causes loss of meter accuracy and oftentimes plugging.

Differential pressure, or difference in pressure, measurement is a widely accepted method for measuring the volume of fluid flowing through a pipeline. Differential pressure simply means measuring the difference in pressure between two points in the pipeline. In operation, a pressure measurement is taken at one location on the pipeline. The flow of the fluid is disrupted downstream of the first pressure measurement in some manner using an obstruction to change the pressure of the fluid. A second pressure measurement is taken at or near this downstream location and the two pressure measurements are compared to determine the volume of fluid flowing through the pipe. The difference in pressure directly correlates, and is proportional, to the square root of the fluid's flow rate through the pipeline. Orifice plates and Venturi wedges have been used to disrupt the fluid flow in pipelines to create the differential pressure effect. However, these devices are co-dependent on Reynolds numbers, require difficult installation procedures, and as mentioned above, are susceptible to wear causing inaccuracies. Other types of flow meters have been developed for use in pipelines to attempt to overcome these deficiencies. However, there remains a need for improved flow meters.

The differential pressure flowmeter of the present invention comprises an element configured such that it will resist erosion to the element and reduce or eliminate settling while having relatively low head loss. Head loss, as used herein, refers to a loss in pressure from the fluid flowing through the pipeline due to the fluid encountering an obstruction, bend in the pipe, or valve. The flow meter disclosed herein is similar to other meters that use differential pressure to measure flow and is capable of use with a variety of materials in gas, slurry, or liquid states. However, the present invention is advantageous over previous flow meters because it is customizable and modular. The present invention also reduces head loss from the fluid encountering the flow meter's obstruction element. The flow meter of the present invention comprises exchangeable obstruction elements that can vary the pressure change between sensors depending on flow parameters as processes change. The flow meter may be tailored to the process system's need or the designer's desired outcome.

Turning now to the figures, and specifically to FIG. 1, there is shown therein a fluid flow meter 10. The flow meter comprises an elongate pipe section 12 having an upstream end 14 and a downstream end 16 based on the direction of fluid flow 15 through the pipe. The pipe section 12 may also comprise an inner diameter 18. A first flange 20 is attached to the upstream end 14. An elongate member 24 is attached to the interior surface of the elongate pipe 12. An upstream pressure sensor 26 is positioned between the flange 20 and the elongate member 24 within the pipe section 12 to measure a first pressure. A downstream pressure sensor 28 is positioned between the first pressure sensor 26 and the second flange 22 to measure a second pressure.

The upstream and downstream flanges 20 and 22 are generally circular comprising a plurality of holes 30 in the flange's periphery used to bolt the flow meter 10 to adjacent sections of the pipeline. The flanges 20 and 22 may be press fit, threaded or welded to the pipe section 12. In this way, the flow meter of the present invention may be placed into an existing pipeline or removed therefrom with relative ease.

Referring now to FIGS. 1 and 2A-2D, the elongate member 24 comprises a first side 32 and a second side 34. A leading end 56 comprises the upstream edge of the elongate member and a trailing edge 53 defines the downstream edge. Preferably the distance between the leading edge 56 and the trailing edge 53 is between seven (7) and eighteen (18) inches for a four (4") pipe. The length of the elongate member 24 may be varied based on the inner diameter of the pipe 12. The first side 32 defines a cylindrical cross-sectional shape with a radius of curvature corresponding to a radius of curvature of the pipe section 12 and extending along an arc of less than one-hundred and eighty (180) degrees. The first side 32 terminates at opposed edges 36. At least one threaded socket 37 is formed in the first side of the elongate member 24. This threaded socket 37 is used to fasten the elongate member 24 to the interior surface of the pipe section. As shown, the elongate member 24 may comprise a plurality of threaded sockets 37 used to fasten the elongate member to the pipe section 12. Accordingly, the pipe section 12 will comprise one or more corresponding holes 39 and couplings 41.

The second side 34 opposes the first side 32 and is exposed to the interior of the pipe section 12. The second side 34 is configured to constrict a cross-sectional area of the pipe. The second side 34 comprises a leading face 38, a trailing face 40, and a truncated apex 42. The truncated apex 42 extends between the opposed edges 36 and defines a rounded edge. The elongate member 24 comprises a bore 44 extending through the elongate member. The downstream pressure sensor 28 is disposed within the bore 44. A washer 45 and gasket 47 may be used to secure the pressure sensor within the bore 44.

A primary seal groove 46 may be formed in the first side 32 of the elongate member. The primary seal groove 46 may be configured to support an O-ring 49 (FIG. 3) within the groove to seal the first side of the elongate member. A series of secondary seal grooves 48 may be formed around the coupling locations and the bore 44 to further seal the elongate member's first side and reduce the likelihood of fluid escaping from holes 39 formed in the pipe section.

In a preferred embodiment, the pipe section 12 may comprise tubing that has been honed to the specifications of the adjacent pipe sections it will be attached to. For example, the pipe section may be honed to an inner diameter dimension of four (4) inch schedule forty (40) pipe. The couplings 41 used to secure the elongate member 24 to the pipe section 12 may comprise one-half (½) inch National Pipe Thread couplings that are welded to the outer surface of the pipe section aligned with holes 39. Such a coupling 41 may also be used to secure the upstream pressure sensor 26 within the pipe section. The flanges 20, 22 may comprise standard ANSI B 16.5 Class 150 high pressure flanges.

As shown in FIG. 1, elongate member 24 has a low profile and preferably does not constrict over fifty percent (50%) of the inner cross-sectional diameter of the pipe section 12. Preferably, the elongate member 24 does not constrict more than forty percent (40%) of the inner cross-sectional diameter of the pipe section. The low profile of the elongate member 24 reduces the amount of wear on the member thus increasing its accuracy over an extended period of time and reducing cost associated with more frequent replacement. The shape of the elongate member 24 also helps to minimize the disruption to the laminar flow 15 of the fluid in the pipe 12 while still achieving sufficient pressure differentials at pressure sensors 20 and 22 to allow accurate measurements.

Turning now to FIGS. 2A through 2D four variations of the elongate member 24 shown in FIG. 1 are illustrated. Each of the members is interchangeable in the flow meter 10 of the present invention and shares a similar geometry. Interchangeability allows for varying differential pressure depending on flow parameters. However, as shown in FIGS. 2A through 2D each elongate member 24 has a different overall length and height. Elongate member B05 has the longest length and also has the greatest surface area to constrict the pipe section at the apex 42 of the elongate member. The main difference between the members shown in FIGS. 2A-2D is the ratio of the height of the constricted region of the inner diameter of the pipe section over the total inner diameter of the pipe. Table 1 shows the relative dimensions of elongate members B05, B06, B07, and B08. The main differences are the height of the apex from the first side, the angle of the leading face, and the overall length. One skilled in the art will appreciate that elongate members of different dimensions may be used with pipe having different inner diameters to achieve the desired results.

TABLE 1

| ELEMENT | β | OAL | h/D | a/A |
|---------|------|---------|-----|-------|
| B05 | 45° | 17.750" | 0.5 | 0.500 |
| B06 | 38.7° | 14.490" | 0.6 | 0.626 |
| B07 | 31.0° | 11.206" | 0.7 | 0.748 |
| B08 | 21.8° | 7.912" | 0.8 | 0.858 |

Figure 3:
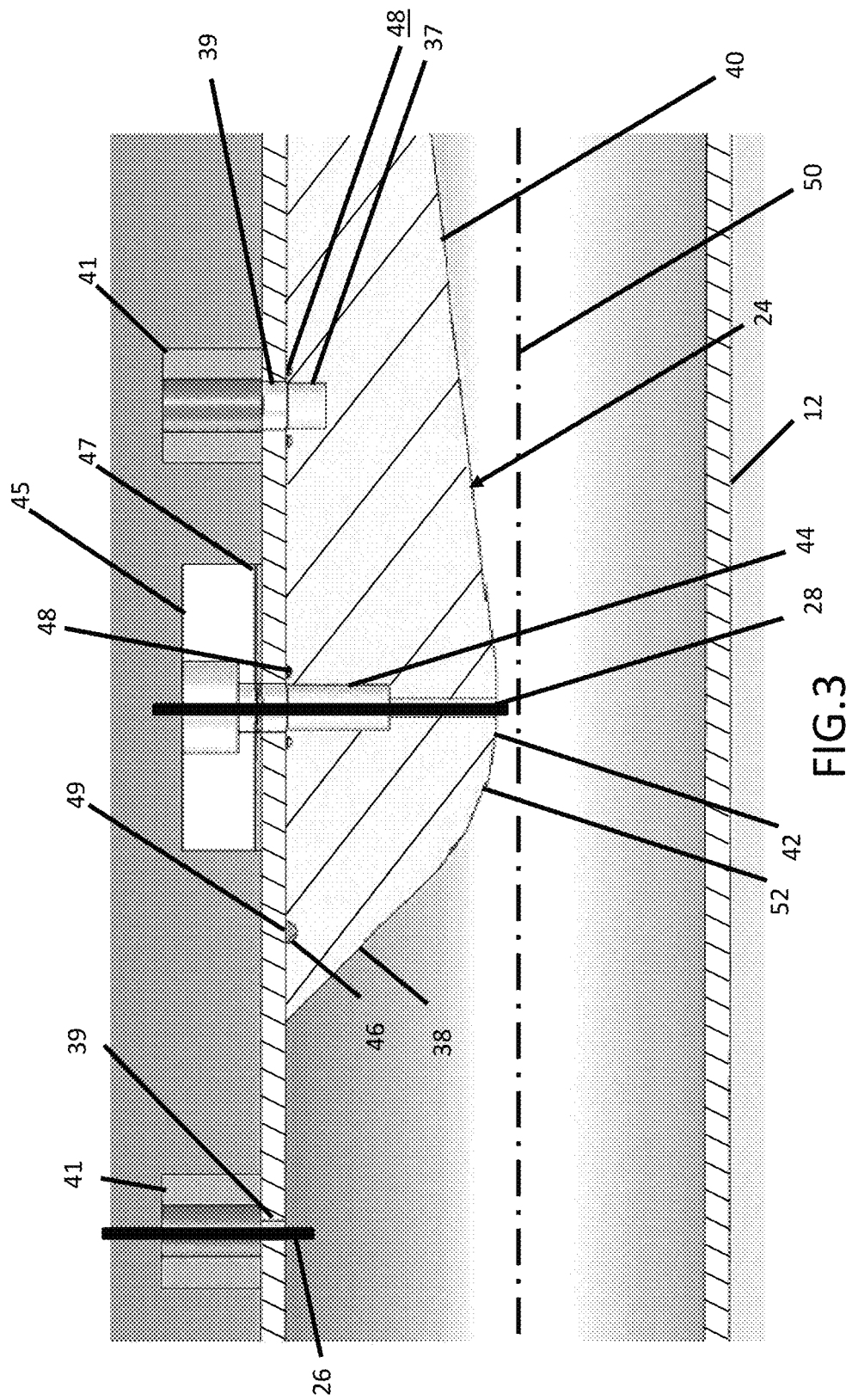
FIG. 3 is a close-up view of the flow meter shown in FIG. 1.

Referring now to FIG. 3, the elongate member 24 is shown in close-up positioned against the interior surface of the pipe section 12. The upstream pressure sensor 26 is positioned within the pipe section 12 upstream of the elongate member 24 to measure a first pressure. The upstream pressure sensor 26 is disposed within a hole 48 formed in the pipe section and secured using a coupling 41. The downstream pressure sensor 28 is positioned within the bore 44 and extends into the inner diameter of the pipe section from bore. The washer 45 and gasket 47 secure the pressure sensor to the pipe section 12 and elongate member 24. Bore 44 is positioned on the truncated apex 42 of the elongate member 24 and downstream of a rounded edge 52 formed at the intersection of the leading face 38 and the truncated apex 42. The rounded edge is orthogonal to a longitudinal axis 50 of the pipe section.

The second side 34 of the elongate member 24 forms a sloped leading face 38 that transitions to the truncated apex 42. The leading face 38 and truncated apex 42 are configured to constrict the cross-sectional area of the pipe. The truncated apex 42 transitions to a trailing face 40 that decreases in height as it extends downstream toward a trailing edge 53 (FIG. 1).

Figure 4:
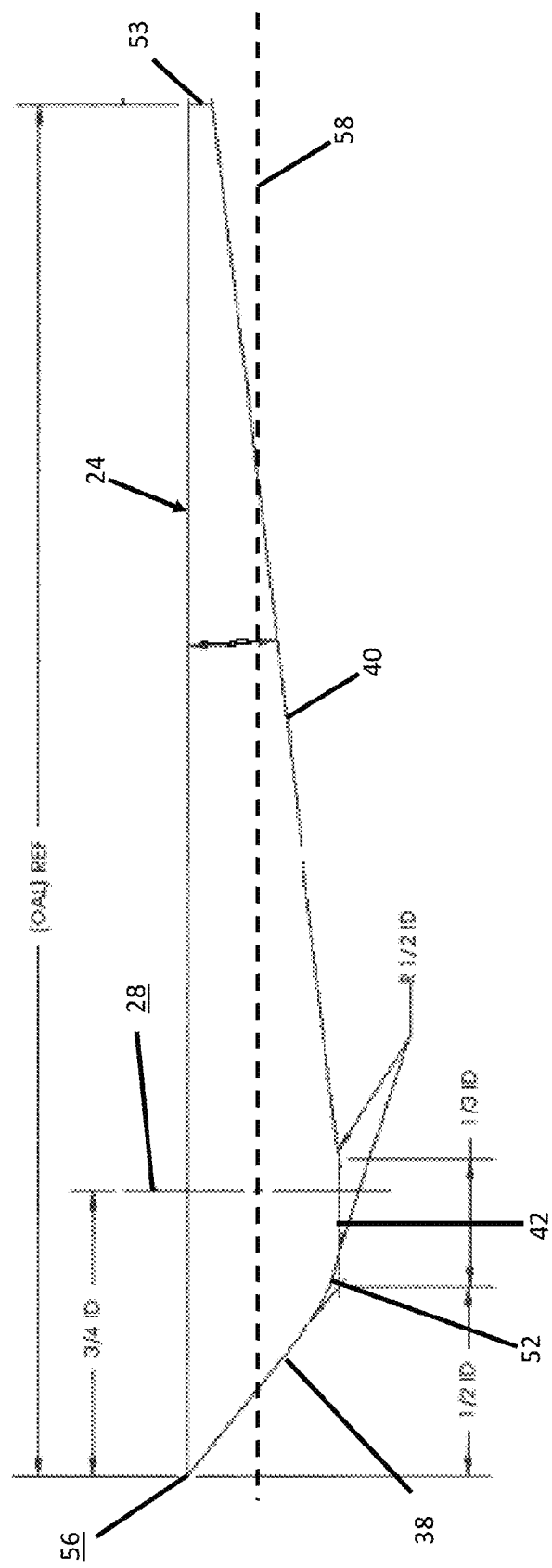
FIG. 4 is a diagram showing preferred dimensions of the elongate member of the flow meter.

With reference now to FIG. 4, a diagrammatic representation of the elongate member 24 is shown for purposes of illustrating a preferred construction of the elongate member. The geometry of the elongate member 24, except the angle of the leading edge and the overall length, is determined by the inner diameter. As shown, the leading face 38 has a length of approximately one-half (½) the inner diameter of the pipe section. The truncated apex 42 has a length of approximately one-third (⅓) the inner diameter of the pipe section 12. The length of the truncated apex 42 may be measured from the apex of the rounded edge 52 to the intersection of the truncated apex with the trailing face 40. The truncated apex 42 comprises a generally planar surface that is orthogonal to the longitudinal axis 50 of the pipe.

The leading face 38 may have an angle of orientation, relative to the longitudinal axis 50 (FIG. 3) of the pipe section 12 of between forty five degrees (45°) and twenty degrees (20°). This angle is determined as a function of the beta ratio. The beta ratio is the ratio of the vertical height of the bottom of the elongate member to the inner diameter of the pipe section 12. The ratios are used to establish a range of Reynolds numbers for which each is best suited. As shown in FIGS. 2A-2D and FIG. 4 the width of the trailing face 40 tapers and the height decreases as the trailing face extends downstream and terminates at a trailing end 53. The angle of slope downward of the trailing face 40 relative to horizontal may be approximately seven degrees (70).

The location of the downstream pressure sensor 28 is shown on the planar surface of the truncated apex and disposed a distance from a leading end 56 of the elongate member 24 that is equal to three-quarters (¾) the inner diameter of the pipe section 12. The first side 32 of the elongate member 24 extends from the leading end 56 to the trailing end 53 and, as discussed previously, defines a cylindrical cross sectional shape with a radius of curvature corresponding to the radius of curvature of the pipe and extending along an arc of less than one-hundred and eighty (180) degrees. The second side extends from the leading end 56 to the trailing end 53 and is exposed to the interior of the pipe section 12. One skilled in the art will appreciate that the elongate member 24 may comprise a longitudinal axis 58 extending from the leading end 56 to the trailing end 53 that is substantially parallel to the longitudinal axis 50 of the pipe section 12. The geometry of the elongate member provides a more structured flow profile to reduce head loss, cavitation, turbulence, and erosion. The structure of elongate member 24 also allows the flow of fluid to return to normal more quickly downstream of the member.

One of ordinary skill in the art will appreciate that while the Figures show configurations for the subject invention, modifications to the particular shape and organization of the flow meter 10 may be made without departing from the spirit of the disclosed invention.

What is claimed is:

1. An apparatus for measuring the flow of fluid through a pipe the apparatus comprising:
   a leading end;
   a trailing end;
   a longitudinal axis;
   a first side which engages an inner surface of the pipe and extends from the leading end to the trailing end and defines a cylindrical cross-sectional shape with a radius of curvature corresponding to a radius of curvature of the pipe and extending along an arc of less than 180 degrees, the first side terminates at opposed lateral edges;
   a second side extends from the leading end to the trailing end and is exposed to an interior of the pipe, the second side defines a constriction in a cross-sectional area of the pipe, the second side has a leading face that is one-half an inner diameter of the pipe in length, a trailing face, and a truncated apex having a length one-third the inner diameter of the pipe;
   wherein the truncated apex extends between the opposed lateral edges and defines a rounded edge that is orthogonal to the longitudinal axis and formed at an intersection of the leading face and the truncated apex; and
   a first seal groove on the first side proximate the leading end, the trailing end, and both opposed lateral edges.

2. The apparatus of claim 1 further comprising a bore extending from the first side to the second side disposed downstream from the leading end a distance equal to three-quarters of the inner diameter of the pipe.

3. The apparatus of claim 2, in which a second seal groove is formed on the first side interior to the first seal groove and entirely around the bore.

4. The apparatus of claim 3 further comprising a pressure sensor disposed within the bore and extending into the interior of the pipe.

5. The apparatus of claim 4 further comprising an upstream pressure sensor disposed within the pipe upstream of the leading end edge.

6. The apparatus of claim 1 wherein the first side has a length between eighteen inches and seven inches.

7. The apparatus of claim 1 wherein the leading face has an angle of orientation, relative to the longitudinal axis of the pipe, of between 45 degrees and 20 degrees.

8. The apparatus of claim 1 wherein a width of the second side tapers from the truncated apex to the trailing end.

9. The apparatus of claim 8 wherein the truncated apex defines a constriction in a cross sectional area of the pipe of between less than fifty percent and ten percent.

10. The apparatus of claim 1 wherein the truncated apex comprises a planar surface that is orthogonal to a longitudinal axis of the pipe.

11. The apparatus of claim 1 comprising a threaded socket formed in the first side to fasten the first side to the inner surface of the pipe.

12. The apparatus of claim 1 in which the longitudinal axis is substantially parallel to a longitudinal axis of the pipe.

13. The apparatus of claim 1 comprising:
   a bore extending through the first side and the second side and disposed downstream from the leading end a distance equal to three-quarters of the inner diameter of the pipe;
   a pressure sensor disposed within the bore and extending into the interior of the pipe;
   an upstream pressure sensor disposed within the pipe upstream of the leading end;
   a threaded socket formed in the first side used to fasten the first side to the inner surface of the pipe; and a second seal groove formed on the first side interior to the first seal groove and entirely around the bore.

14. A fluid flow meter comprising:
an elongate pipe section having an upstream end and a downstream end and an inner diameter;
a first flange attached to the upstream end;
a second flange attached to the downstream end;
an elongate member attached to an interior surface of the elongate pipe, the member comprising:
a first side defining a cylindrical cross-sectional shape with a radius of curvature corresponding to a radius of curvature of the pipe section and extending along an arc of less than 180 degrees, the first side terminating at opposed lateral edges;
a second side opposing the first side and exposed to an interior of the pipe section, the second side configured to constrict a cross-sectional area of the pipe section, the second side comprising a leading face having a length one-half the inner diameter of the pipe, a trailing face, and an truncated apex having a length one-third the inner diameter of the pipe;
a first seal groove that defines a first seal boundary on the first side proximate both opposed lateral edges; and
a second seal groove interior to the first seal boundary on the first side;
wherein the truncated apex extends between the opposed lateral edges and defines a rounded edge that is orthogonal to a longitudinal axis of the pipe section and formed at an intersection of the leading face and the truncated apex;
an upstream pressure sensor positioned within the pipe section upstream of the leading face of the elongate member to measure a first pressure; and
a downstream pressure sensor positioned on the truncated apex surrounded by the first seal boundary and the second seal groove and downstream of the leading face to measure a second pressure.

15. The fluid flow meter of claim 14 further comprising a bore extending through the elongate member and surrounded by the second seal groove; wherein the downstream pressure sensor is disposed within the bore.

16. The fluid flow meter of claim 14 wherein the elongate member has a length between eighteen inches and seven inches.

17. The fluid flow meter of claim 14 wherein the leading face has an angle of orientation, relative to a longitudinal axis of the pipe, of between 45 degrees and 20 degrees.

18. The fluid flow meter of claim 14 wherein a width of the trailing face tapers and a height decreases as the trailing face extends downstream.

19. The fluid flow meter of claim 18 wherein the second side of the elongate member defines a constriction in a cross sectional area of the pipe of less than fitly percent.

20. The fluid flow meter of claim 14 wherein the truncated apex comprises a planar surface that is orthogonal to a longitudinal axis of the pipe.

21. The fluid flow meter of claim 14 wherein the elongate member comprises a threaded socket formed in the first side used to fasten the elongate member to the interior surface of the pipe.

22. The fluid flow meter of claim 14 wherein the elongate member comprises a longitudinal axis extending from a leading end to a trailing end, wherein the elongate member is affixed to the pipe so that its longitudinal axis is substantially parallel to a longitudinal axis of the pipe.

23. The fluid flow meter of claim 22 comprising:
a bore extending through the elongate member and through the truncated apex and disposed downstream from the leading end a distance equal to three-quarters of the inner diameter of the pipe;
wherein the downstream pressure sensor is disposed within the bore;
a threaded socket formed in the first side of the elongate member used to fasten the elongate member to the interior surface of the pipe.

* * * * *